(12) United States Patent
Singhal et al.

(10) Patent No.: US 12,032,813 B1
(45) Date of Patent: Jul. 9, 2024

(54) SYSTEM AND METHOD FOR A USER INTERFACE TO FACILITATE COMPARISONS OF DATA

(71) Applicant: Charles Schwab & Co., Inc., San Francisco, CA (US)

(72) Inventors: Saurabh Singhal, Cary, NC (US); Charles E. Gotlieb, San Francisco, CA (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 355 days.

(21) Appl. No.: 17/004,400

(22) Filed: Aug. 27, 2020

Related U.S. Application Data (60) Provisional application No. 62/900,627, filed on Sep. 15, 2019.

(51) Int. Cl.

| | |
|---|---|
| *G06F 3/04842* | (2022.01) |
| *G06F 3/0481* | (2022.01) |
| *G06T 11/20* | (2006.01) |
| *G06T 11/60* | (2006.01) |
| *G06T 13/80* | (2011.01) |
| *G06F 16/248* | (2019.01) |
| *G06Q 40/06* | (2012.01) |

(52) U.S. Cl.
CPC ........ *G06F 3/04842* (2013.01); *G06F 3/0481* (2013.01); *G06T 11/206* (2013.01); *G06T 11/60* (2013.01); *G06T 13/80* (2013.01); *G06F 16/248* (2019.01); *G06Q 40/06* (2013.01); *G06T 2210/44* (2013.01); *G06T 2213/00* (2013.01)

(58) Field of Classification Search
CPC .. G06F 3/04842; G06F 3/0481; G06F 16/248; G06T 11/60; G06T 11/206; G06T 13/80; G06T 2210/44; G06T 2213/00; G06Q 40/06

See application file for complete search history.

(56) References Cited

U.S. PATENT DOCUMENTS

| | | | | |
|---|---|---|---|---|
| D775,192 S | * | 12/2016 | Caldwell | G06Q 40/00 D14/488 |
| D798,886 S | * | 10/2017 | Prophete | D14/485 |
| 10,395,412 B2 | * | 8/2019 | Berglund | G06T 13/80 |
| 2003/0218619 A1 | * | 11/2003 | Ben-Tovim | G06F 3/04845 345/649 |
| 2008/0192056 A1 | * | 8/2008 | Robertson | G06T 11/206 345/440 |
| 2010/0253686 A1 | * | 10/2010 | Alsbury | G06T 11/206 345/440 |
| 2012/0313957 A1 | * | 12/2012 | Fisher | G06T 11/206 345/589 |

(Continued)

OTHER PUBLICATIONS

Theodore Socolofsky and Claudia Kale, Request for Comments 1180—A TCP/IP Tutorial (Network Working Group, Jan. 1991), available at https://tools.ietf.org/pdf/rfc1180.pdf (Year: 1991).*

(Continued)

*Primary Examiner* — Justin R. Blaufeld
(74) *Attorney, Agent, or Firm* — Harness, Dickey & Pierce, P.L.C.

(57) ABSTRACT

A system and method animates bar graphs into roll graphs and roll graphs into bar graphs for securities analysis and trading.

6 Claims, 8 Drawing Sheets

(56) References Cited

U.S. PATENT DOCUMENTS

| | | | |
|---|---|---|---|
| 2013/0300743 A1* | 11/2013 | Degrell | G06T 11/206 |
| | | | 345/440 |
| 2013/0309648 A1* | 11/2013 | Park | G06F 16/24534 |
| | | | 434/350 |
| 2015/0294409 A1* | 10/2015 | Madhavan | G06Q 40/04 |
| | | | 705/37 |
| 2016/0103872 A1* | 4/2016 | Prophete | G06Q 10/0639 |
| | | | 707/722 |
| 2016/0104311 A1* | 4/2016 | Allyn | G06T 1/20 |
| | | | 345/473 |
| 2017/0076471 A1* | 3/2017 | Prophete | G06F 40/137 |
| 2017/0091967 A1* | 3/2017 | Roepke | G06T 13/80 |
| 2018/0004811 A1* | 1/2018 | Keahey | G06F 16/248 |
| 2018/0033180 A1* | 2/2018 | Geddes | G06T 13/00 |

OTHER PUBLICATIONS

Defense Advanced Research Projects Agency, Request for Comments 793—Transmission Control Protocol (Sep. 1981) (Year: 1981).*

\* cited by examiner

SYSTEM AND METHOD FOR A USER INTERFACE TO FACILITATE COMPARISONS OF DATA

RELATED APPLICATION

This application claims the benefit of U.S. Provisional Patent Application Ser. No. 62/900,627 entitled, "Method and Apparatus for Comparing a Securities Model with Actual Holdings and Trading Securities to Match the Model, filed by Saurabh Singhal and Charles E. Gotlieb on Sep. 15, 2019, having the same assignee as the present application and is hereby incorporated by reference in its entirety.

FIELD OF THE INVENTION

The present invention is related to computer software and hardware and more specifically to computer software and hardware for securities portfolio comparisons and trading.

BACKGROUND OF THE INVENTION

Current computer system user interfaces that allow comparisons of two pieces of information are suboptimal. What is needed is a system and method for improved comparisons of two pieces of information.

SUMMARY OF INVENTION

A system and method allows a user to compare one set of information with another, for example, asset allocations among an investor's portfolio, with target allocations from a model selected for that investor, using two stacked bar graphs, one for the portfolio and one for the model, or two roll graphs, also representing the same information as was in the stacked bar graphs. A roll graph is a pie chart with the center removed, so that it is in the shape of a silhouette of a car tire.

Each graph represents a total, for example, of the investor's portfolio or the model, and the portions of the bar graph or roll graph represent percentages of different asset classes of that total.

The user can switch the graphs between the bar graphs and the roll graphs by clicking a button, or optionally, by clicking a portion, for example an asset class region of either graph then displayed.

If the graphs being displayed are bar graphs, when the button is clicked, each bar graph, when displayed horizontally, is animated lifting up its ends and combining them into a roll graph, and if the graphs being displayed are roll graphs, when the button is clicked, each roll is separated at one junction between asset classes, and the roll graphs are animated unrolling into bar graphs. The ends of the bar graphs may be joined to form a roll graph at the 12 o'clock position of the roll graph, and the roll graph may be split at the 12 o'clock position when unrolled into a bar graph.

In one embodiment, if the user clicks the portion of either bar graph corresponding to any asset class of that bar graph, the click operates just like the button click to roll each of the two bar graphs into roll graphs, but also rotates the roll graphs so that the left edge of the clicked portion (e.g. the clicked asset class) in each roll graph is rotated into the 12 o'clock position, so that when, or after, the bar graphs are rolled, the clicked asset class on both roll graphs are immediately to the right of the 12 o'clock position of the roll graphs. If the user clicks the portion of either roll graph, for example the portion corresponding to any asset class of the roll graph, the click operates just like the button click to unroll the bar graph into a roll graph, but before doing so, the click also rotates the roll graph so that the right edge of the clicked asset class is rotated into the 12 o'clock position, so that when the roll graphs are unrolled, the clicked asset class on both bar graphs are on the left side 75 of each bar graph.

BRIEF DESCRIPTION OF THE DRAWINGS

FIG. 2, consisting of FIG. 2A and FIG. 2B, is a flowchart illustrating a method of displaying a user interface of a computer system according to one embodiment of the present invention.

DETAILED DESCRIPTION OF A PREFERRED EMBODIMENT

Figure 1:
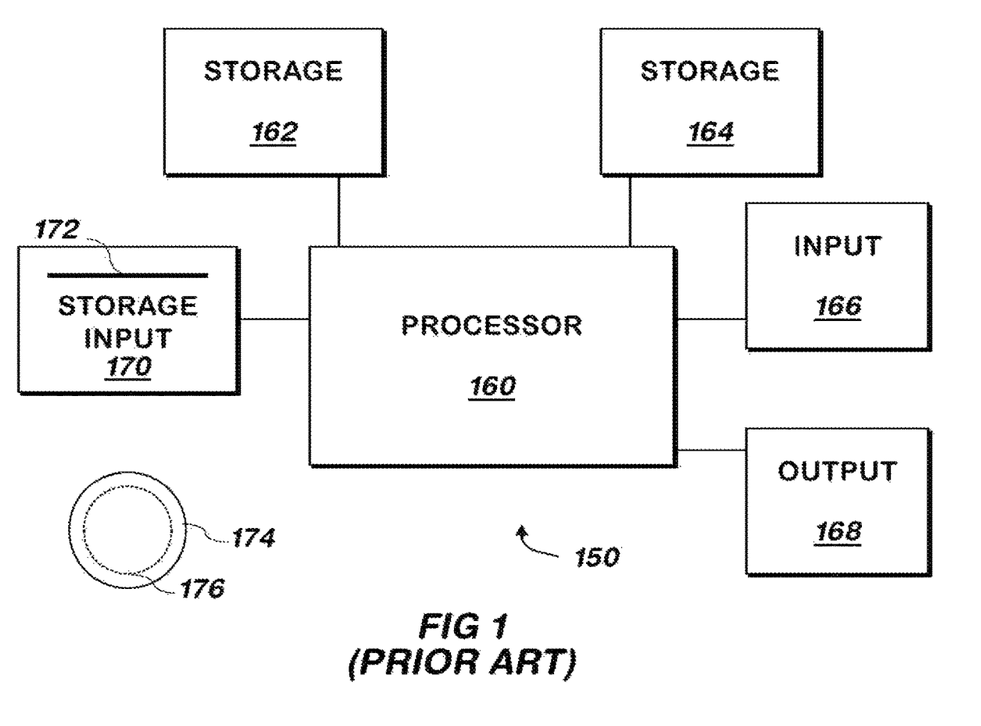
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. The components of the system described herein may be implemented via one or more hardware computer processors that operate under firmware or hardware control as described herein.

Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional ORACLE SPARC T SERIES SERVER running the ORACLE SOLARIS operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as WINDOWS 10) commercially available from MICROSOFT Corporation of Redmond Washington or a Macintosh computer system running the MACOS (such as Mojave) or OPENSTEP operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY S10 commercially available from SAMSUNG ELECTRONICS GLOBAL of Seoul, South Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2A:
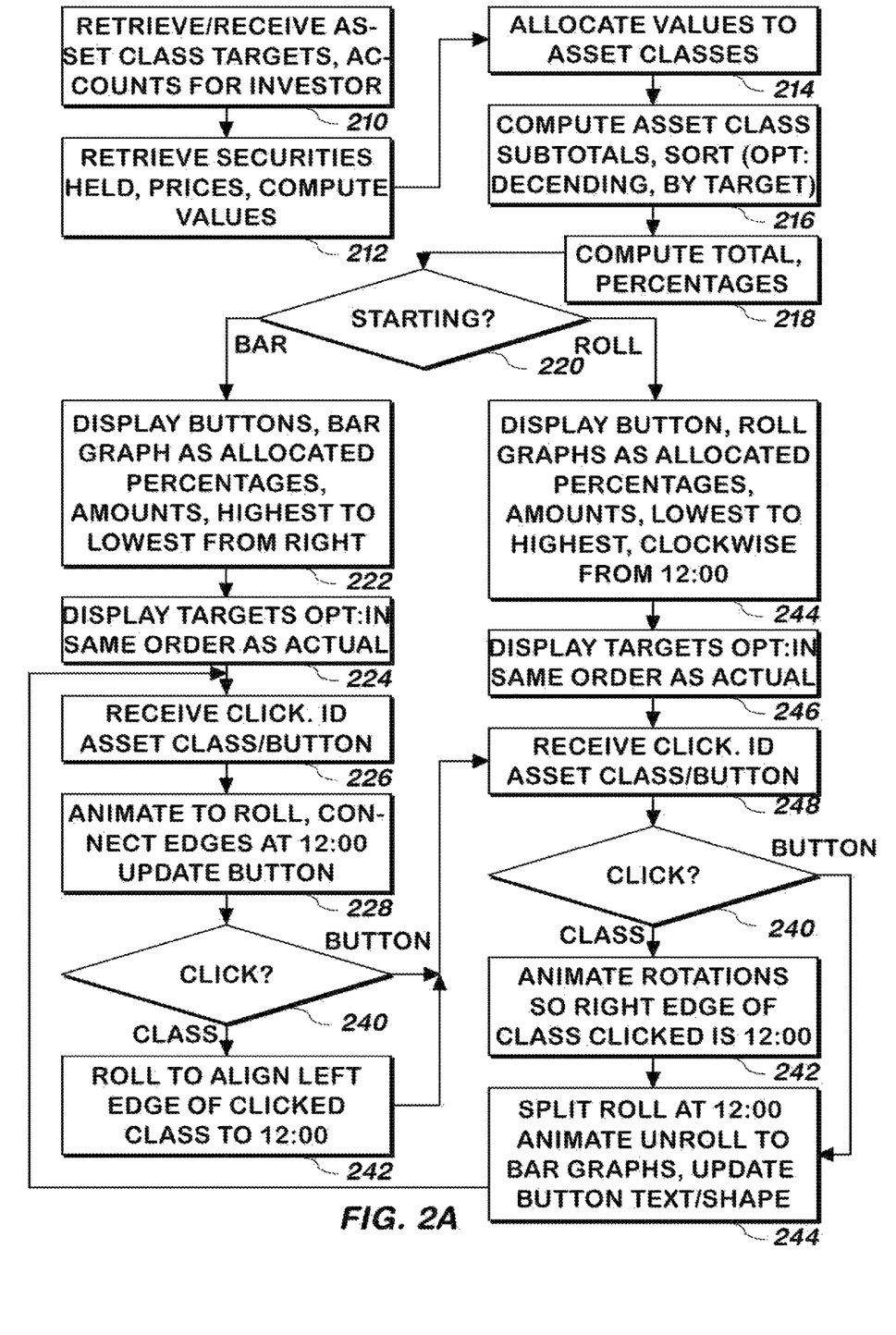
Figure 2B:
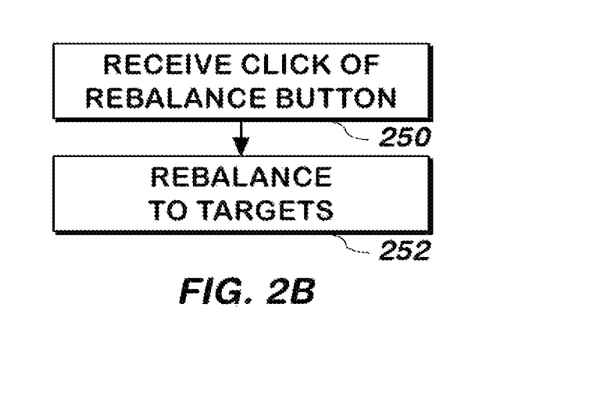

Referring now to FIG. 2, consisting of FIGS. 2A and 2B, a method of displaying a user interface of a computer system is shown according to one embodiment of the present invention. The present invention is described in the context of managing a portfolio by comparing asset class amounts to asset class targets, and purchasing or selling securities corresponding to the differences, but the present invention operates as a user interface for any type of information.

Identifiers of one or more accounts holding the investor's portfolio and the asset class targets are received or retrieved for the investor 210. Asset classes are conventional security asset classes, which may include such classes as stocks, fixed income securities, commodities, and cash, or may include other asset classes. Asset class targets for the investor are percentage of total investments that are deemed suitable for the investor using conventional techniques, such as those described in U.S. published application 2014/0279701 which is incorporated by reference. Accounts may include conventional investment accounts, bank accounts, or other types of accounts, and the account information may be supplemented with asset information for assets that may not be held in accounts that are accessible to the system and method as part of step 210. The assets in the investor's portfolio may also be specified by the user and received, instead of being retrieved from the accounts.

The account information received in step 210 is used to retrieve the amount and identifier of securities and cash held in each of the accounts, and a conventional quotation system is used to obtain prices for those securities using the identifier of each security. The prices of the securities is multiplied by the amount of each security held in the accounts or otherwise specified to compute the value held for each identifier of each security held by the investor 212.

The values are then allocated to the asset classes, for example by using a look up table that identifies the asset class for each identifier of each security 214. Asset class subtotals are computed 216 by summing the values across each of the asset classes, and the asset classes, their subtotals, and targets may be sorted in descending order using the target or actual percentages, highest to lowest. The total value and percentage of each asset class is computed 218.

Figure 3A:
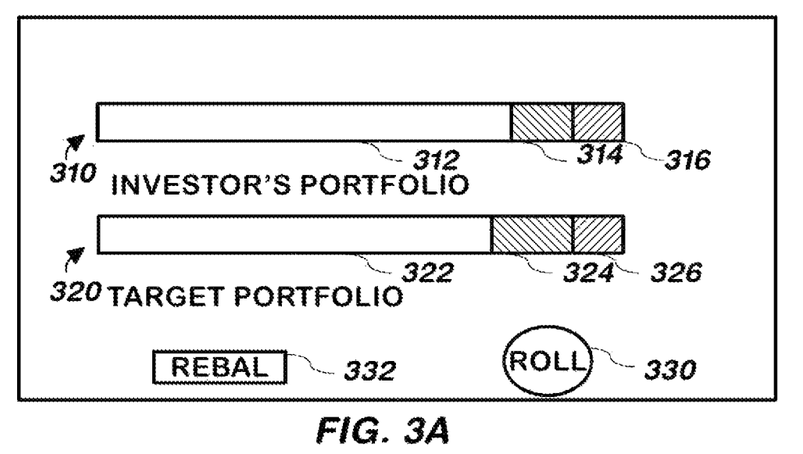
FIG. 3A is an illustration of two bar charts according to one embodiment of the present invention.
Figure 3B:
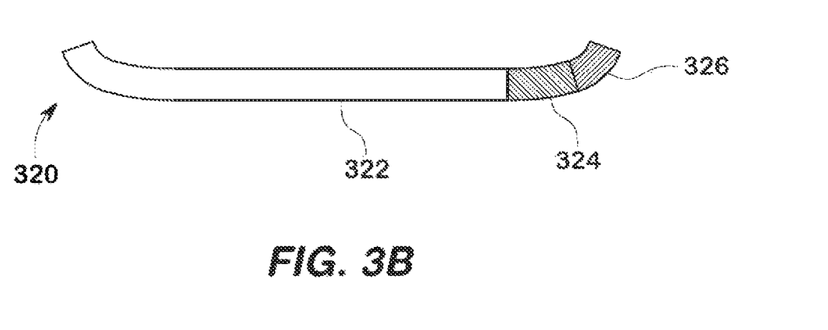
FIG. 3B, FIG. 3C and FIG. 3D are illustrations of FIG. 3A being rolled into FIG. 3E.
Figure 3C:
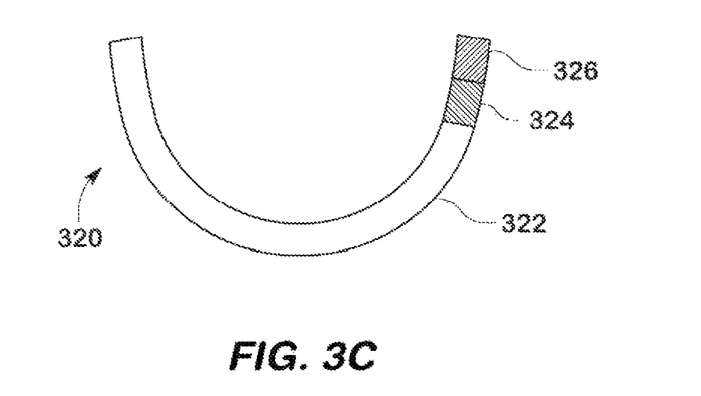
Figure 3D:
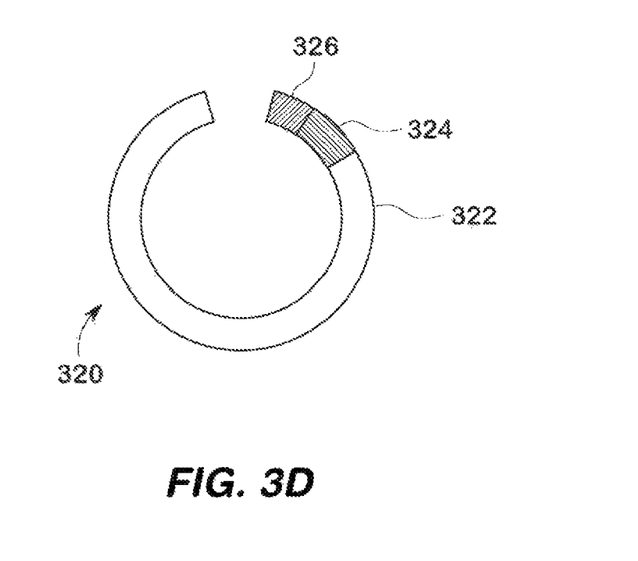
Figure 3E:
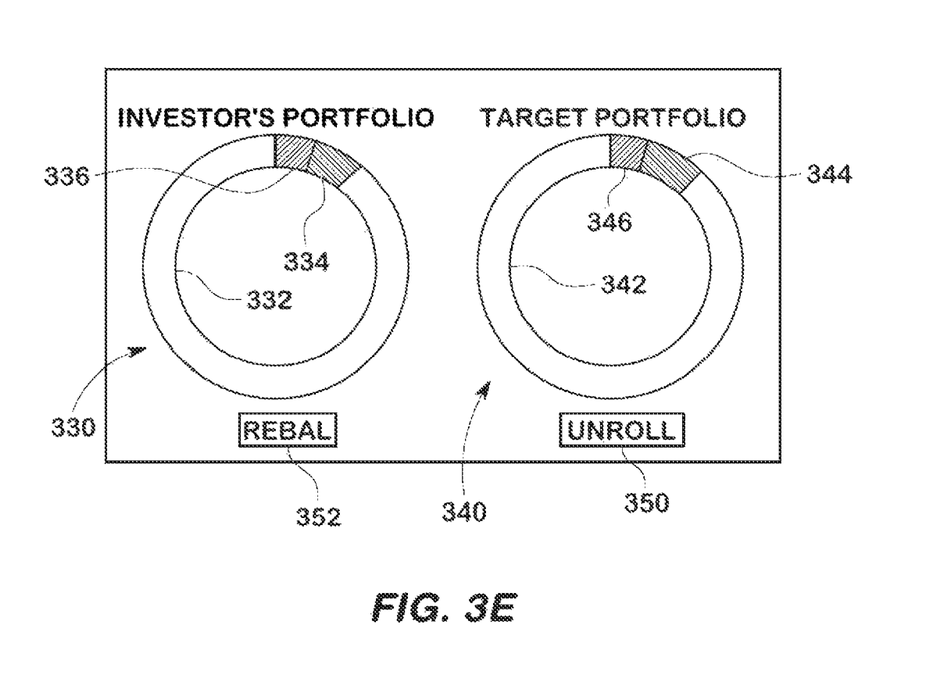
FIG. 3E is an illustration of two roll charts according to one embodiment of the present invention.
Figure 3F:
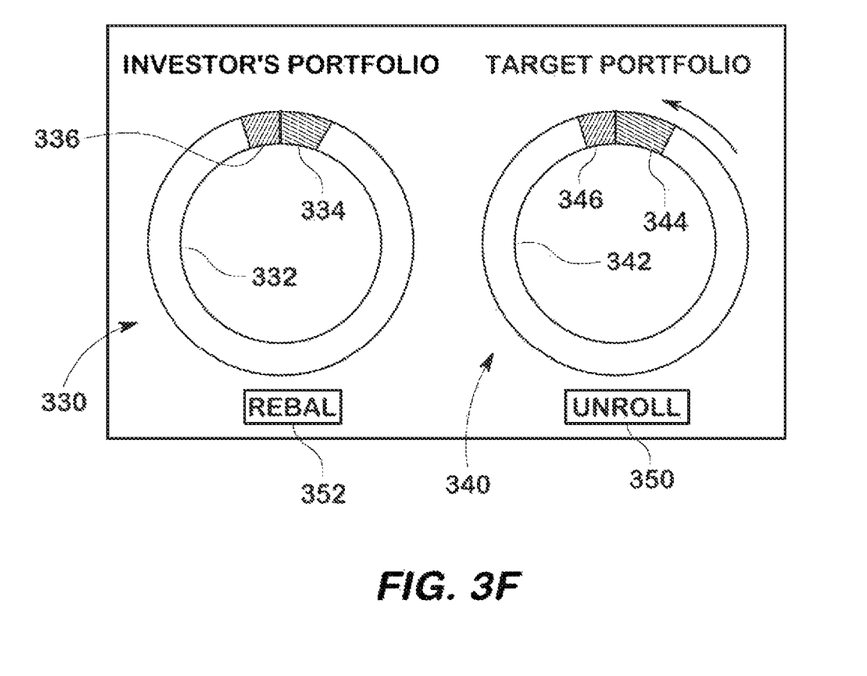
FIG. 3F is an illustration of the two roll charts of FIG. 3E being rolled in the direction of the arrow near the top right of the Figure.
Figure 3G:
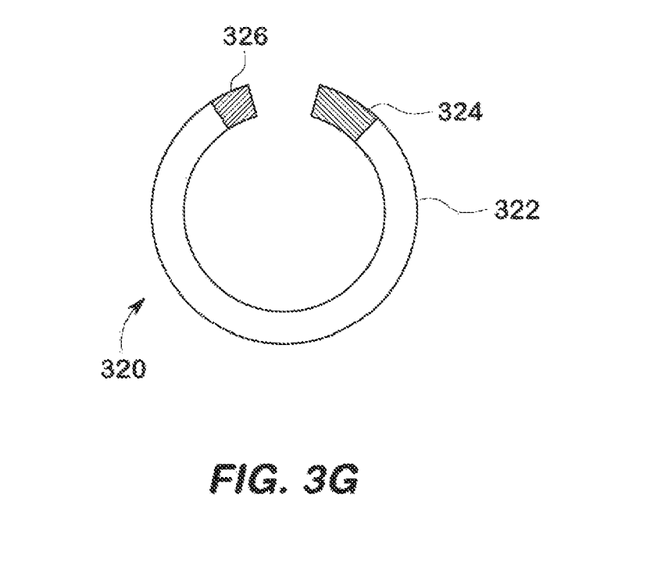
FIG. 3G, FIG. 3H and FIG. 3I illustrate the roll graphs of FIG. 3F being unrolled into the bar graphs of FIG. 3J.
Figure 3H:
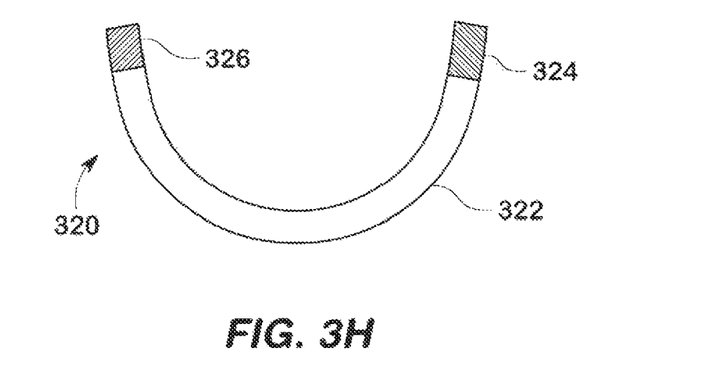
Figure 3I:
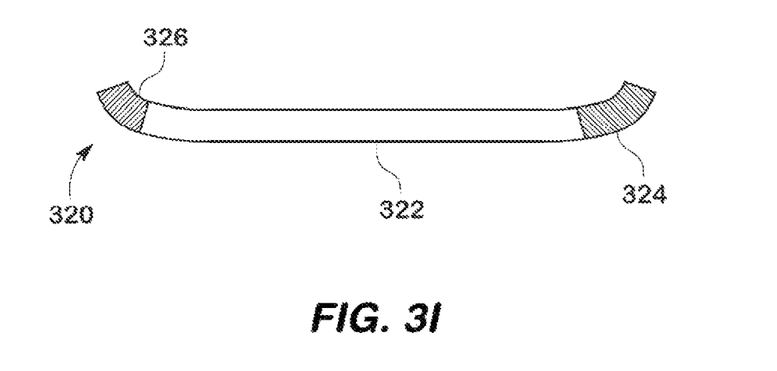

As used herein, two types of graphs may be presented to the investor. One type of graph is a conventional stacked bar graph, optionally displayed horizontally, with each of the asset classes displayed using a different color or texture from the other asset classes, and a visual representation of the percentage of the target (on one graph) of the investor's portfolio of each asset class stacked on top of one another or directly to the side of one another. The other type of graph is a roll graph, where the visual representation of the percentage of each target or subtotal is displayed as a conventional pie graph with the center of the pie blanked out so that only an area at the edge of the pie is visible. Referring momentarily to FIGS. 3A-3J, two different, conventional, bar graphs 310, 320 are shown in FIG. 3A and two corresponding conventional roll graphs 330, 340 are shown in FIG. 3E. Bar graph 310 corresponds to roll graph 330 and bar graph 320 corresponds to roll graph 340. Each graph 310, 320, 330, and 340 displays three different asset classes, a first asset class 312, 322, 332, and 342, a second asset class 314, 324, 334, 344 and a third asset class 316, 326, 336, 346. Buttons 330, 332, 350 and 352 operate as described herein. Buttons 330 and 350 have shapes that roughly correspond to the graphs they produce. The 12 o'clock position of roll graph 330 is on the left side of its display of the third asset class 336.

Referring again to FIG. 2, a starting type of graph, either roll graph of bar graph is selected for the user of the method, which may be always the same for all users, always the same for each user, or the last type of graph the user selected. In still another embodiment, if the user routinely changes the graph from one type to the other but not as frequently in the reverse direction, the graph type (i.e. bar or roll) most frequently changed to is selected as the starting graph type for the user. The user may be the investor or another party such as an investment advisor of the investor. Selection of the starting graph may be made at any step before step 220.

If the starting graph is a bar graph 220, buttons are displayed that operate as described below, and the percentages for each asset class of the investor's portfolio are displayed as a single bar graph (horizontally in one embodiment), with the asset classes ordered using the computed percentages of each asset class, descending from left to right 222.

The percentages of the target allocation of the investor are displayed 224 in a different bar graph below the asset class allocations of the investor's portfolio using the same order of asset classes, though any order and arrangement of the two graphs themselves with respect to one another (and their orientations, horizontal or vertical) may be used.

The user may click a button that changes the graph type, or may click on one of the elements of the bar graph. At step 226, the click is received and the asset class or button clicked is identified. An animation is performed that makes the bar graphs of FIG. 3A appear as if they are being repositioned into the positions of the roll graphs of FIG. 3E, and then rolled up, by curving up both outer sides (FIG. 3B) and continuing (FIGS. 3C and 3D) until the bar graphs have been converted to roll graphs, with the left and right edges of each bar graph connected at the 12 o'clock position of the respective roll graphs, and the text of the button that changes the graph type may be updated 228. It is noted that the 12 o'clock position as used herein may be replaced with other positions such as 6 o'clock, 9 o'clock or 3 o'clock, and any number of one or more graphs may be used with the present invention. When the bar graphs are displayed, the button text may read "roll" and when the roll graphs are displayed, the button text may read "unroll", for example.

If one of the percentages was clicked on the bar graph 230, the roll graph animation continues by rolling the roll graphs so that the left edge of the clicked class is at the 12 o'clock position for both roll graphs 232 and the method continues at step 238, and otherwise 230, the method continues at step 238.

If the starting graph is a roll graph 220, buttons are displayed that operate as described herein, and the percentages for each asset class of the investor's portfolio are displayed as a single roll graph, with the asset classes ordered using the computed percentages of each asset class, ascending clockwise starting with the smallest percentage having its left edge at the 12 o'clock position 234. The percentages of the target allocation of the investor are displayed 236 in a different roll graph next to the asset class allocations of the investor's portfolio, using the same order as the investor percentages were displayed in step 234, though any order and arrangement of the two roll graphs with respect to one another may be used. The order of the asset classes in any graph may be based on the percentages of the target allocations, or the investor's portfolio.

The user may click a button that changes the graph type, or one of the elements of the roll graph. At step 238, the click is received and the asset class or button clicked is identified.

Figure 3J:
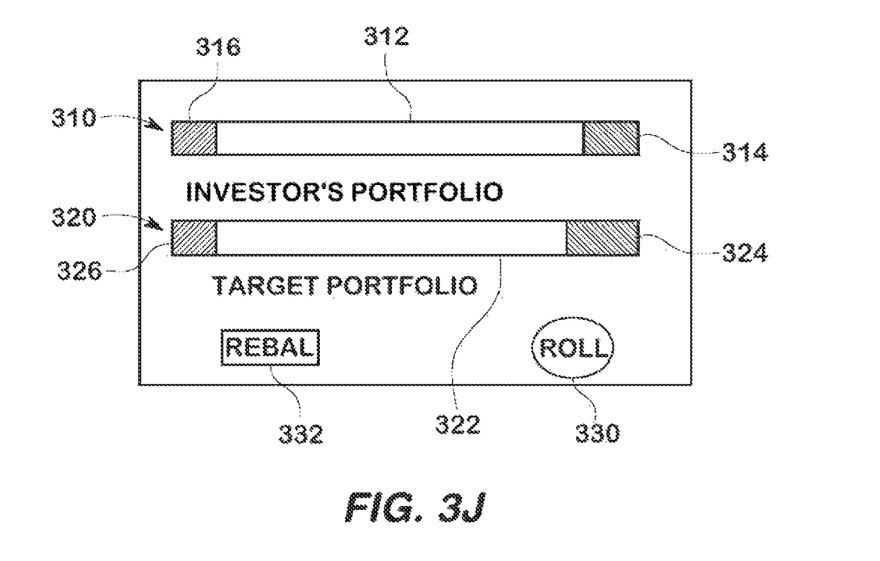

If the click was on a representation of an asset class on the roll graph 240 (FIG. 3E), the roll graph is rotated (as indicated by the arrow above roll graph (340 in FIG. 3F) so that the right edge of the clicked asset class (346 in FIG. 3F) is at the 12 o'clock position on the roll graph 242 and then the roll graph is unrolled by splitting it at the 12 o'clock position (FIG. 3G) and animated unrolling by rotating the edges from the split downward (FIGS. 3H and 3I) to be level with the 6 o'clock position of the roll graph and then the two resulting bar graphs may be animated moving into the position shown in FIG. 3J.

At any time, the user may request the investor's portfolio be rebalanced to match the target portfolio. Referring now to FIG. 2B, a click of a rebalance button is received 250 and the investor's portfolio is rebalanced to allow the asset class percentages to match the asset class percentages of the target portfolio 252 by selling assets from any asset classes in the investor's portfolio having a percentage of the investor's portfolio that exceeds the percentages of the corresponding asset classes in the target portfolio and purchasing assets for the investor's portfolio from asset classes having a percentage of the investor's portfolio that are below that of the target portfolio.

System

Figure 4:
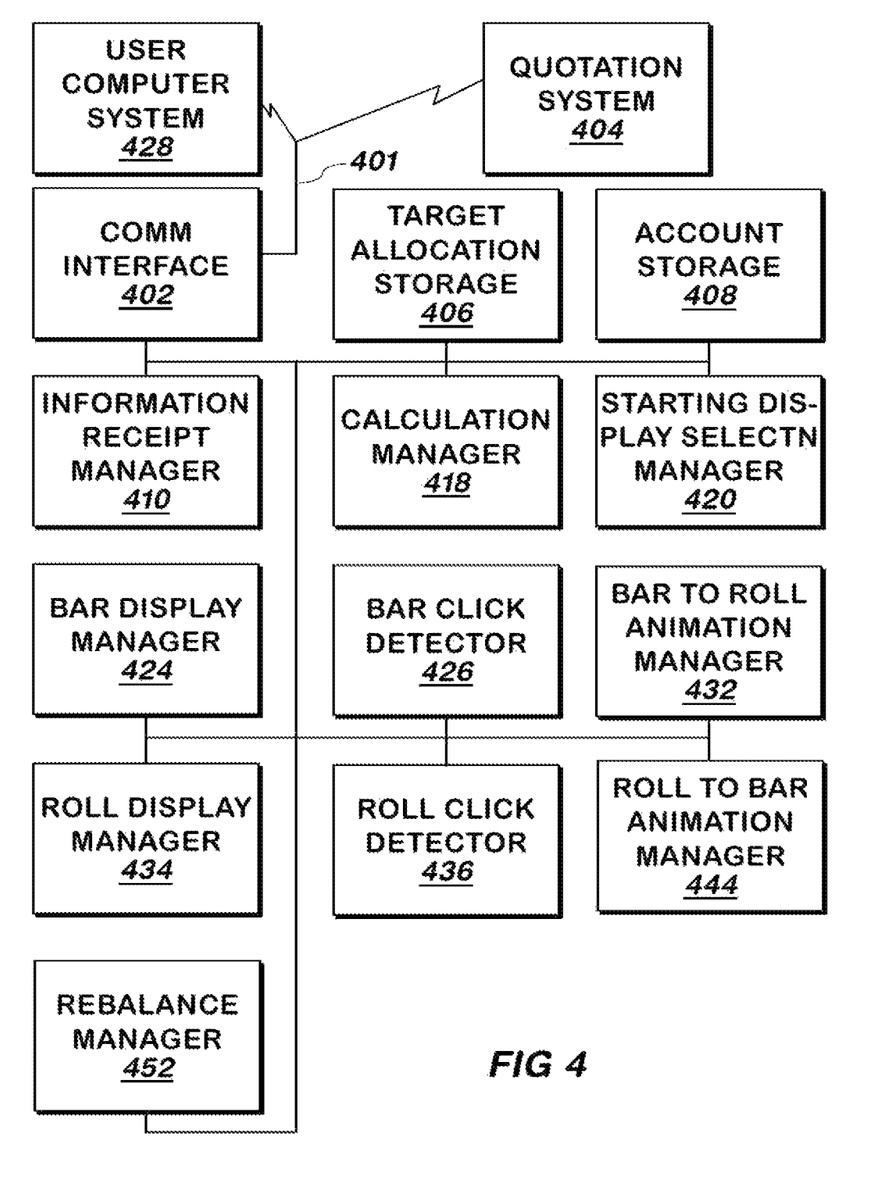
FIG. 4 is a block schematic diagram of a system for displaying a user interface of a computer system according to one embodiment of the present invention.

FIG. 4 is a system for displaying a user interface according to one embodiment of the present invention. The system is described with reference to securities trading, but the system may display a user interface for any type of information. Referring now to FIG. 4, communication interface 402 is a conventional communication interface running TCP/IP and Ethernet protocols, connected to the networks of the Internet via input/output 401. In one embodiment, all communication with the system of FIG. 4 is made via communication interface 402. Target allocation storage 406 stores the target allocation of each of the asset classes, such target allocation having been selected for the investor, and also stores a table of security identifiers, and the asset class to which each security identifier is assigned. Account storage 408 stores conventional securities account information of the user, including symbol and quantity of assets held by the investor.

Upon receipt of a request by a user, information receipt manager 410 requests and receives the identifiers of the accounts of the investor (or a proxy for such accounts, such as one or more user identifiers), and provides such identifiers to calculation manager 418. Calculation manager 418 uses the information for the accounts whose identifiers it receives to retrieve identifiers of the securities held by the investor from those accounts as indicated by account storage 408. Calculation manager 418 retrieves quotations of current prices of each of the securities whose identifiers it retrieved from quotation system 404, which is a conventional quotation system that provides current prices of the securities for which it receives identifiers. Calculation manager 418 then multiplies the price by the quantity of each security held by the investor, allocates the resulting value to the asset classes according to the table in target allocation storage 406, and computes and sorts the asset class subtotals, as well as the total and percentages, as described above. In one embodiment, any cash held by any of the accounts corresponding to the identifiers it receives, are allocated by calculation manager to a "cash" asset class. Calculation manager 418 provides all such information it computes into a graph object, and provides the graph object to starting display selection manager 420.

When it receives the graph object, starting display selection manager 420 identifies the graph type of the starting display as described above. A conventional cookie or other similar stored set of information, may be used to identify the user, or the user's preferences or last graph type, and each time the user changes a graph type as described herein, the graph type to which the user changed is stored in the cookie by the animation manager 432 or 444 that displays the change or by the detector 426, 436 that detects the user's request to make the change, both described in more detail herein and below. If the starting display is a bar graph, starting display selection manager 420 provides the graph object to bar display manager 424, and if the starting display is a roll graph, starting display selection manager 420 provides the graph object to roll display manager 434.

When it receives the graph object, bar display manager 424 provides to user computer system 428 (which may be a conventional computer system or smartphone running a browser or an app) of the user for display on such system the buttons and the bar graphs as described above. Bar display manager 424 (or bar click detector 426, in one embodiment) adds to the graph object boundary information that indicates the clickable area of each portion of the bar graphs corresponding to the different asset classes, and the type of asset class, and adds boundary information that indicates the clickable areas of the two buttons displayed as described herein. Bar display manager 424 or bar click detector 426 provides the graph object to bar click detector 426. Bar display manager 424 also provides to the user's computer system 428 computer code that reports the coordinates of any click the user makes to the display bar display manager 424 initiates.

When the user clicks either an asset class displayed on one of the bar graphs, or one of the buttons, bar click detector 426 receives the coordinates of the click, and provides the coordinates of the click and the graph object to bar to roll animation manager 432.

When it receives such information, bar to roll animation manager 432 animates the change of the bar graphs to roll graphs as described herein, and updates the button that converts the graphs one type to the other and redisplays the buttons. In one embodiment, bar to roll animation manager 432 is a component of a server, though in another embodiment it is placed on the user's computer system by the display manager 424 or 434 that provides the initial graph display as described herein. If the coordinates of the click are within a boundary of one of the asset classes as displayed on the bar graphs, bar to roll animation manager 432 also animates the rolling of the roll graphs to align the left edge of the clicked class to the 12 o'clock position as described above. Bar to roll animation manager 432 (or bar click detector 426, in one embodiment) replaces in the graph object the coordinates of the various asset classes in the graph object to correspond to the roll graphs, and the coordinates of each of the button as newly displayed. Bar to roll animation manager 432 (or bar click detector 426, in one embodiment) provides the graph object to roll click detector 436 described in more detail below.

When it receives the graph object, roll display manager 434 provides to user computer system 428 of the user for display on such system the buttons and the bar graphs as described above. Roll display manager 434 (or roll click detector 436, in one embodiment) adds to the graph object boundary information that indicates the clickable area of each portion of the roll graphs corresponding to the different asset classes, and the type of asset class, and adds boundary information that indicates the clickable areas of the two buttons displayed as described herein. Roll display manager 434 or roll click detector 436 provides the graph object to roll click detector 436. Roll display manager 434 also provides to the user's computer system 428 computer code that reports the coordinates of any click the user makes to the display roll display manager 434 initiates.

When the user clicks either an asset class displayed on one of the bar graphs, or one of the buttons, roll click detector 436 receives the coordinates of the click, and provides the coordinates of the click and the graph object to roll to bar animation manager 444.

When it receives such information, roll to bar animation manager 444 animates the change of the roll graphs to bar graphs as described herein, and updates the button that converts the graphs one type to the other and redisplays the buttons. In one embodiment, roll to bar animation manager 444 is a component of a server, though in another embodiment it is placed on the user's computer system by the display manager 424 or 434 that provides the initial graph display as described herein. If the coordinates of the click are within a boundary of one of the asset classes as displayed on the roll graphs, roll to bar animation manager 444 first animates the rolling of the roll graphs to align the right edge of the clicked class to the 12 o'clock position as described above. Roll to bar animation manager 444 (or roll click detector 436, in one embodiment) replaces in the graph object the coordinates of the various asset classes in the graph object to correspond to the roll graphs, and the coordinates of each of the button as newly displayed. Roll to bar animation manager 444 (or roll click detector 436, in one embodiment) provides the graph object to roll click detector 436 described in more detail below.

Each system element may include a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

The present invention allows the user to see how the bar graphs and roll graphs are displaying the same information, in a different format and thus improve the computer system user interface. In one embodiment, the computer systems that provide the improved user interface also allow stock trading via the communication interface with an electronic stock exchange.

Certain Embodiments

Described is a computer-implemented method of providing for display a computer system user interface, including:
   providing for display, via a TCP/IP-compatible communication interface, a stacked bar graph and a user interface control element; receiving from a user an operation of
   the user interface element or a different user interface control element; and
   responsive to said operation, providing via the TCP/IP-compatible communication interface a first animation of a movement of the ends of the stacked bar graph moving closer and closer to one another until they are substantially adjacent to one another as a remainder of the stacked bar graph is animated into a roll graph.

The method may additionally include redisplaying the user interface control element as one that will perform a different function, after the receiving step.

The method may contain additional features whereby the different function is an animation of the roll graph into a second stacked bar graph.

The method may additionally include providing via the TCP/IP-compatible communication interface a second animation that rotates the roll graph so that a border of the element of the stacked bar graph including the different user interface control element is on top of the roll graph when or after the bar graph is animated into the roll graph.

The method may contain additional features whereby the second animation rotates the roll graph after the ends of the stacked bar graph are substantially adjacent to one another.

The method may contain additional features whereby:
   the stacked bar graph includes two or more elements, each element representing different data;
   each element of the stacked bar graph includes a separate user interface control element; and
   the different user interface control element includes one of the separate user interface control elements.

Described is a system for providing for display a computer system user interface, including:
   a bar display manager having an input for receiving data, the bar display manager for providing for display via an output coupled to a TCP/IP-compatible communication interface, a stacked bar graph representing the data and a user interface control element;
   a bar click detector having an input coupled for receiving from a user an operation of the user interface element or a different user interface control element and for providing at an output an indication of said operation; and a bar to roll animation manager having an input coupled to the bar display manager input for receiving the data, the bar to roll animation manager input coupled to the bar click detector output for receiving the indication, the bar to roll animation manager for, responsive to the indication, providing via an output coupled to the TCP/IP-compatible communication interface, a first animation of a movement of the ends of the stacked bar graph moving closer and closer to one another until they are substantially adjacent to one another as a remainder of the stacked bar graph is animated into a roll graph.

The system may contain additional features whereby the bar to roll animation manager is additionally for redisplaying via the bar to roll animation manager output the user interface control element as one that will perform a different function, responsive to the indication traveller.

The system may contain additional features whereby the different function is an animation of the roll graph into a second stacked bar graph.

The system may contain additional features whereby the bar to roll animation manager is additionally for providing at the bar to roll animation manager output via the TCP/IP-compatible communication interface a second animation that rotates the roll graph so that a border of the element of the stacked bar graph including the different user interface control element is on top of the roll graph when or after the bar graph is animated into the roll graph.

The system may contain additional features whereby the bar to roll animation manager provides the second animation so as to rotate the roll graph after the ends of the stacked bar graph are substantially adjacent to one another.

The system may contain additional features whereby:
the stacked bar graph includes two or more elements, each element representing different data;
each element of the stacked bar graph includes a separate user interface control element; and
the different user interface control element includes one of the separate user interface control elements; and
the indication provided by the bar click detector indicates which of the separate user interface control elements was operated.

Described is a computer program product including a computer useable medium having computer readable program code embodied therein for providing for display a computer system user interface, the computer program product including computer readable program code devices configured to cause a computer system to:
provide for display, via a TCP/IP-compatible communication interface, a stacked bar graph and a user interface control element;
receive from a user an operation of the user interface element or a different user interface control element; and
responsive to said operation, provide via the TCP/IP-compatible communication interface a first animation of a movement of the ends of the stacked bar graph moving closer and closer to one another until they are substantially adjacent to one another as a remainder of the stacked bar graph is animated into a roll graph.

The computer program product may additionally include computer readable program code devices configured to cause the computer system to redisplay the user interface control element as one that will perform a different function, after the receiving the operation.

The computer program product may contain additional features whereby the different function is an animation of the roll graph into a second stacked bar graph.

The computer program product may additionally include computer readable program code devices configured to cause the computer system to provide via the TCP/IP-compatible communication interface a second animation that rotates the roll graph so that a border of the element of the stacked bar graph including the different user interface control element is on top of the roll graph when or after the bar graph is animated into the roll graph.

The computer program product may contain additional features whereby the second animation rotates the roll graph after the ends of the stacked bar graph are substantially adjacent to one another.

The computer program product may contain additional features whereby:
the stacked bar graph includes two or more elements, each element representing different data;
each element of the stacked bar graph includes a separate user interface control element; and
the different user interface control element includes one of the separate user interface control elements.

What is claimed is:

1. A computer-implemented method of providing for display a computer system user interface, the method comprising:
providing for display, via a TCP/IP-compatible communication interface, a stacked bar graph and a user interface control element, the stacked bar graph including a plurality of elements each representing different data, the plurality of elements in the stacked bar graph arranged with a pair of end elements and a remainder of the plurality of elements therebetween, the stacked bar graph being a first stacked bar graph;
receiving, from a user, a first operation of the user interface control element or a different user interface control element;
responsive to the first operation, providing via the TCP/IP-compatible communication interface, a first animation of a movement of the pair of end elements of the first stacked bar graph moving closer and closer to one another while the remainder of the plurality of elements included in the first stacked bar graph remain connected together during the first animation until the pair of end elements of the first stacked bar graph are substantially adjacent to one another with the remainder of the plurality of elements in a same order therebetween to form a roll graph;
receiving, from the user, a second operation of the user interface control element or the different user interface control element; and
responsive to the second operation, providing via the TCP/IP-compatible communication interface, a second animation of i) rotating the roll graph so that a border of different ones of the plurality of elements of the first stacked bar graph is on top of the roll graph when or after the first stacked bar graph is animated into the roll graph to generate a rotated roll graph, and ii) unrolling the rotated roll graph into a second stacked bar graph such that the different ones of the plurality of elements of the roll graph form the pair of end elements of the second stacked bar graph with a remainder of the plurality of elements therebetween in the second stacked bar graph remaining connected together during the second animation until each of the plurality of elements are horizontally arranged with at least one of the pair of end elements of the second stacked bar graph being different from the pair of end elements of the first stacked bar graph.

2. The method of claim 1, wherein:
each of the plurality of elements is a separate user interface control element.

3. A system for providing for display a computer system user interface, comprising:
a memory and a processor, the memory storing computer readable code that, when executed by the processor, configures the system to,
provide for display via an output coupled to a TCP/IP-compatible communication interface, a stacked bar graph and a user interface control element, the stacked bar graph including a plurality of elements each representing different data, the plurality of elements in the stacked bar graph arranged with a pair of end elements and a remainder of the plurality of elements therebetween, the stacked bar graph being a first stacked bar graph,
receive, from a user, a first operation of the user interface control element or a different user interface control element,
responsive to the first operation, provide via the TCP/IP-compatible communication interface, a first animation of a movement of the pair of end elements of the first stacked bar graph moving closer and closer to one another while the remainder of the plurality of elements included in the first stacked bar graph remain connected together during the first animation until the pair of end elements of the first stacked bar graph are substantially adjacent to one another with the remainder of the plurality of elements in a same order therebetween to form a roll graph,
receiving, from the user, a second operation of the user interface control element or the different user interface control element, and
responsive to the second operation, providing via the TCP/IP-compatible communication interface, a second animation of i) rotating the roll graph so that a border of different ones of the plurality of elements of the first stacked bar graph is on top of the roll graph when or after the first stacked bar graph is animated into the roll graph to generate a rotated roll graph, and ii) unrolling the rotated roll graph into a second stacked bar graph such that the different ones of the plurality of elements of the roll graph form the pair of end elements of the second stacked bar graph with a remainder of the plurality of elements therebetween in the second stacked bar graph remaining connected together during the second animation until each of the plurality of elements are horizontally arranged with at least one of the pair of end elements of the second stacked bar graph being different from the pair of end elements of the first stacked bar graph.

4. The system of claim 3, wherein:
each of the plurality of elements of is a separate user interface control element.

5. A non-transitory computer readable medium having computer readable code embodied therein that, when executed by a computer system, causes the computer system to:
provide for display, via a TCP/IP-compatible communication interface, a stacked bar graph and a user interface control element, the stacked bar graph including a plurality of elements each representing different data, the plurality of elements in the stacked bar graph arranged with a pair of end elements and a remainder of the plurality of elements therebetween, the stacked bar graph being a first stacked bar graph;
receive, from a user, a first operation of the user interface control element or a different user interface control element;
responsive to the first operation, provide via the TCP/IP-compatible communication interface, a first animation of a movement of the pair of end elements of the first stacked bar graph moving closer and closer to one another while the remainder of the plurality of elements included in the first stacked bar graph remain connected together during the first animation until the pair of end elements of the first stacked bar graph are substantially adjacent to one another with the remainder of the plurality of elements in a same order therebetween-to form a roll graph;
receiving, from the user, a second operation of the user interface control element or the different user interface control element; and
responsive to said second operation, providing via the TCP/IP-compatible communication interface, a second animation of i) rotating the roll graph so that a border of different ones of the plurality of elements of the first stacked bar graph is on top of the roll graph when or after the first stacked bar graph is animated into the roll graph to generate a rotated roll graph, and ii) unrolling the rotated roll graph into a second stacked bar graph such that the different ones of the plurality of elements of the roll graph form the pair of end elements of the second stacked bar graph with a remainder of the plurality of elements therebetween in the second stacked bar graph remaining connected together during the second animation until each of the plurality of elements are horizontally arranged with at least one of the pair of end elements of the second stacked bar graph being different from the pair of end elements of the first stacked bar graph.

6. The non-transitory computer readable medium of claim 5, wherein:
each of the plurality of elements is a separate user interface control element.

* * * * *